(12) United States Patent
Howard et al.

(10) Patent No.: US 6,629,415 B2
(45) Date of Patent: Oct. 7, 2003

(54) METHODS AND APPARATUS FOR MODELING GAS TURBINE ENGINE COMBUSTOR LINERS

(75) Inventors: Edward Lee Howard, Cincinnati, OH (US); Gilbert Farmer, Cincinnati, OH (US); James Hollice Poynter, Hamilton, OH (US); Ronald Lee Sheranko, Cincinnati, OH (US); Gregory Thomas Lucas, Cincinnati, OH (US)

(73) Assignee: General Electric Co., Schenectady, NY (US)

( * ) Notice: Subject to any disclaimer, the term of this patent is extended or adjusted under 35 U.S.C. 154(b) by 58 days.

(21) Appl. No.: 10/029,364

(22) Filed: Oct. 27, 2001

(65) Prior Publication Data

US 2003/0079530 A1 May 1, 2003

(51) Int. Cl.⁷ .................................................. F02G 3/00
(52) U.S. Cl. ............................................ 60/752; 60/777
(58) Field of Search ................ 60/752, 777; 29/890.02; 73/116

(56) References Cited

U.S. PATENT DOCUMENTS

| | | | | |
|---|---|---|---|---|
| 3,672,162 A | * | 6/1972 | Rygelis et al. | ............. 60/39.32 |
| 4,476,194 A | * | 10/1984 | Sanborn et al. | ............. 428/585 |
| 4,498,617 A | | 2/1985 | Guertin et al. | |
| 5,412,967 A | | 5/1995 | Ishihara | |
| 5,623,827 A | * | 4/1997 | Monty | .......................... 60/748 |
| 6,135,343 A | | 10/2000 | Thorngren et al. | |
| 6,260,359 B1 | * | 7/2001 | Monty et al. | ................. 60/752 |

* cited by examiner

*Primary Examiner*—Charles G. Freay
*Assistant Examiner*—John F Belena
(74) *Attorney, Agent, or Firm*—Nathan D. Herkamp; Armstrong Teasdale LLP; Robert B. Reeser, III

(57) ABSTRACT

A method for fabricating a three-dimensional turbine engine combustor liner model includes coupling at least a first member to a second member to form an assembly that has an inner surface. The assembly inner surface simulates an inner surface of the aircraft engine combustor liner. The first member is at least one of a pre-formed conical member and a pre-formed cylindrical member, and the second portion is at least one of a pre-formed conical member and a pre-formed cylindrical member. The method also includes coupling the assembly to a baseplate, and coupling a plurality of templates to the assembly.

18 Claims, 4 Drawing Sheets

METHODS AND APPARATUS FOR MODELING GAS TURBINE ENGINE COMBUSTOR LINERS

BACKGROUND OF THE INVENTION

This invention relates generally to gas turbine engine combustor liners, and more specifically to methods and apparatus for modeling gas turbine engine combustor liners.

A turbine engine includes a compressor for compressing air which is channeled to a combustor and mixed with fuel wherein the mixture is ignited within a combustion chamber for generating hot combustion gases. At least some known combustors include a nuggeted liner assembly which extends downstream from an inlet to a nozzle and defines a combustion chamber. A portion of the panels include cooling nuggets formed between adjacent panels, that extend radially outwardly or inwardly from the panels and away from the combustion chamber.

During engine development, combustor mock-ups are utilized to simulate and determine aerodynamic performance, heat transfer performance, and mechanical design performance. Such mock-ups are also used to simulate and perform profile and pattern factor development tests, and the data from such tests are used in improving the design, production, and tooling of the combustors.

Because of the complexity of the gas turbine engine combustor liners, the fabrication of the liners is often a complex and costly process. More specifically, at least some known combustor liners are fabricated from circumferential rings of material that are machined to provide a contoured surface that is representative of the combustor being tested. However, machining the combustor liners to provide the contoured surfaces may be a time-consuming, challenging, and laborious task.

BRIEF DESCRIPTION OF THE INVENTION

In one aspect of the invention, a method for fabricating a three-dimensional turbine engine combustor liner model is provided. The method includes coupling at least a first member to a second member to form an assembly that has an inner surface that simulates an inner surface of the aircraft engine combustor liner. The first member is at least one of a pre-formed conical member and a preformed cylindrical member, and the second portion is at least one of a pre-formed conical member and a pre-formed cylindrical member. The method also includes coupling the assembly to a baseplate, and coupling a plurality of templates to the assembly.

In another aspect, a combustor liner model is provided for producing test data representative of a gas turbine engine combustor. The model includes a plurality of members coupled together. The members include at least a first panel member and a second panel member. The first panel member is fabricated from at least one of a pre-formed metallic cylinder section and a pre-formed metallic conical section, and includes an inner surface and an outer surface. The second panel member is fabricated from at least one of a pre-formed metallic conical section and a pre-formed metallic cylindrical portion, and includes an inner surface and an outer surface. The first panel member is coupled to the second panel member such that the first panel member and second panel member inner surfaces simulate an inner surface of the modeled gas turbine engine combustor.

In a further aspect, a method for modeling a gas turbine engine combustor liner is provided. The method includes coupling a first member including at least one of a pre-formed cylindrical member and a pre-formed conical member to a spacer, coupling a second member including at least one of a pre-formed cylindrical member and a pre-formed conical member to the spacer to form an assembly that has an inner surface that simulates an inner surface of the gas turbine engine combustor liner, wherein the spacer is between the first and second members, and coupling the assembly to a baseplate, such that the assembly extends substantially perpendicularly from the baseplate.

DETAILED DESCRIPTION OF THE INVENTION

Figure 1:
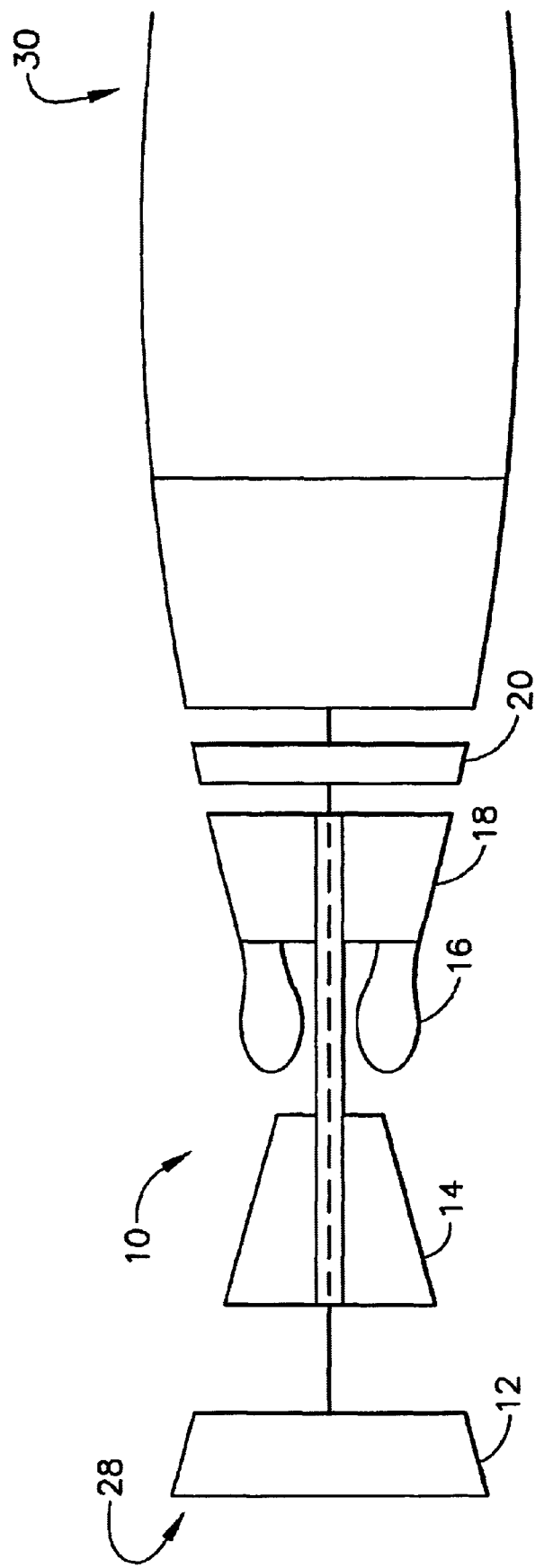
FIG. 1 is an exemplary schematic illustration of a gas turbine engine including a combustor.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 drives turbines 18 and 20, and turbine 20 drives fan assembly 12. Turbine 18 drives high-pressure compressor 14.

Figure 2:
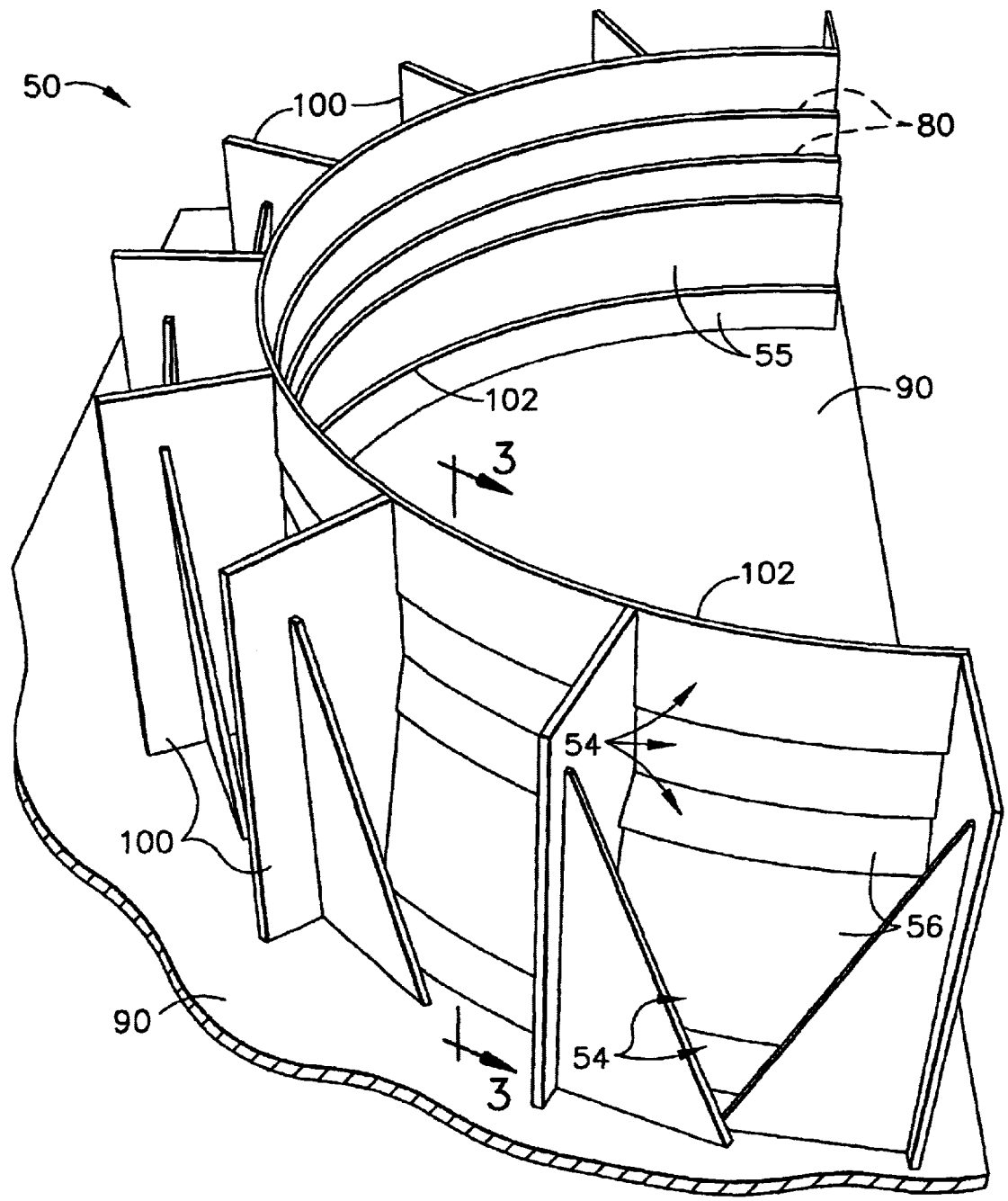
FIG. 2 is an exemplary perspective view of a portion of a combustor liner model.
Figure 3:
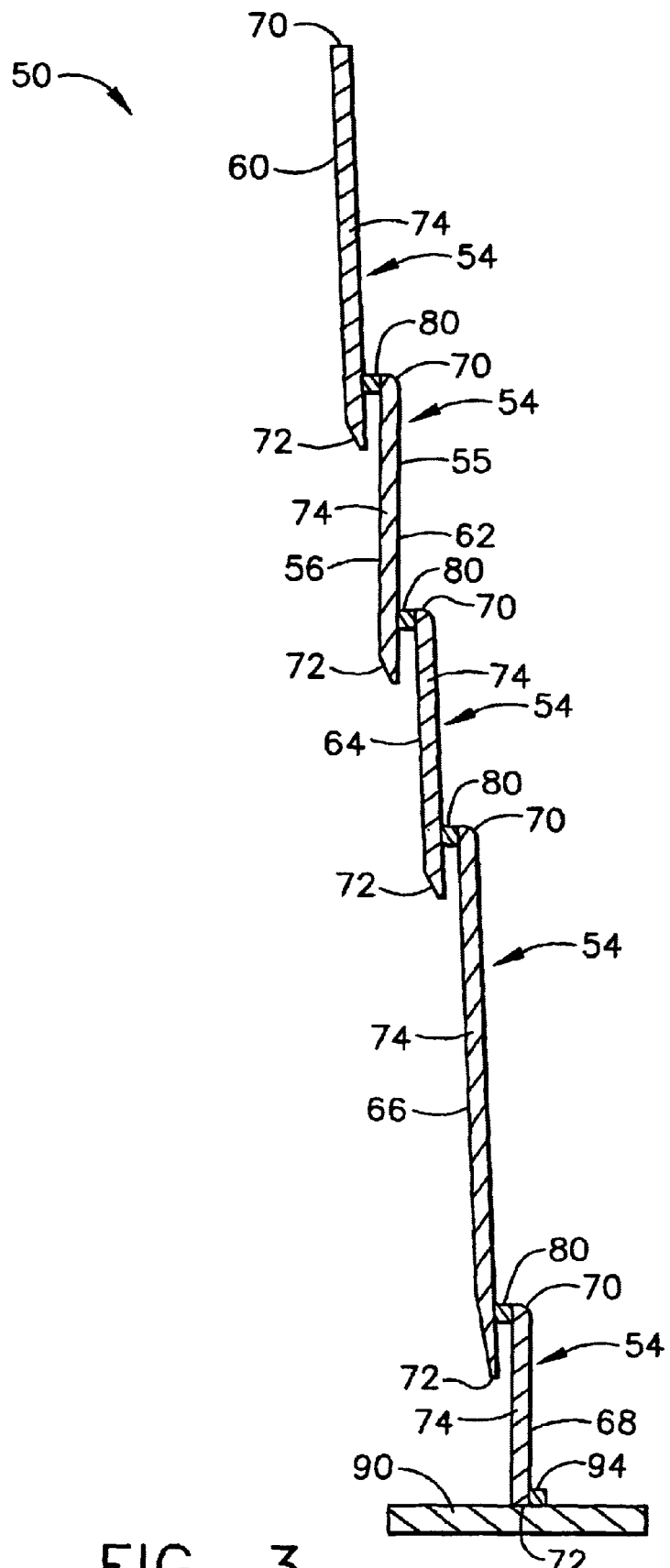
FIG. 3 is a cross-sectional view of the combustor liner model shown in FIG. 2 and taken along line 3—3.

FIG. 2 is an exemplary perspective view of a portion of a combustor liner model 50 used to simulate a gas turbine engine combustor liner (not shown) included as part of a combustor, such as combustor 16 shown in FIG. 1. FIG. 3 is a cross-sectional view of combustor liner model 50 taken along line 3—3. The combustor liner being modeled includes a plurality of panels (not shown) which define a series of steps (not shown), each of which form a distinct portion of the combustor liner. The panels are connected serially and nuggets (not shown) are formed between adjacent connected panels.

When assembled, combustor liner model 50 simulates the gas turbine engine combustor liner for development testing, including but not limited to aerodynamic testing, heat transfer testing, mechanical design testing, profile testing, and pattern factor development. More specifically, combustor liner model 50 includes a plurality of members 54 coupled together to simulate the combustor liner being modeled. Members 54 are fabricated from a metallic material that is identical to the material used in fabricating the combustor panels being modeled. Each member 54 includes an inner surface 55 and an outer surface 56. Furthermore, each member 54 is either a pre-formed cylindrical section or a pre-formed conical section and is selected depending on a contour of the combustor liner being modeled. In the exemplary embodiment, a first member 60 is a cylindrical member, a second member 62 is a conical member, third and fourth members 64 and 66, respectively, are conical members, and a fifth member 68 is a conical member.

Members 54 are coupled together to extend circumferentially. More specifically, each member 54 includes a first end 70, a second end 72, and a body 74 that extends arcuately therebetween. In the exemplary embodiment, each member body 74 extends approximately 180°, and as such, at least two of each member, 60, 62, 64, 66, and 68 are coupled end 70 to end 72, such that model liner 50 extends substantially continuously and circumferentially. In another embodiment, each member body 74 extends approximately 120° and as such, at least three of each member 60, 62, 64, 66, and 68 are coupled together to form combustor liner model 50.

In the exemplary embodiment, each member 54 is coupled to an adjacent member 54, such that members 54 are coupled serially. For example, in the exemplary embodiment, first member 60 is coupled serially to second member 62, which is also coupled to third member 64. Third member 64 is coupled between second and fourth members 62 and 66, respectively, and fifth member 68 is coupled serially to fourth member 66. More specifically, each member 60, 62, 64, 66, and 68 is coupled to a spacer 80. Spacers 80 extend between adjacent members 54 and create a nugget height for combustor model liner 50.

Members 54 are coupled to a baseplate 90 that is fabricated from the same metallic material used in fabricating each member 54. A mounting flange 94 is also coupled to baseplate 90. More specifically, members 54 are coupled to extend substantially perpendicularly from baseplate 90. In the exemplary embodiment, fifth member 68 is attached to baseplate 90 to facilitate assembly of combustor liner model 50.

A plurality of templates 100 are also attached to baseplate 90 and extend substantially perpendicularly from baseplate 90. Templates 100 are also attached to members 54 and include a contoured edge 102 that is coupled against member inner surfaces 56. Edge 102 facilitates an inner surface 56 of combustor liner model 50 being contoured to have substantially the same cross-sectional profile and contour of the combustor liner being modeled. In the exemplary embodiment, templates 100 are fabricated from the same material used to fabricate baseplate 90 and members 54.

In the exemplary embodiment, adjacent panels 54 and spacers 80 are coupled to each other and to templates 100 and baseplate 90 by tack welding. However, before panels 54 are welded to baseplate 90 and template 100, the mating surfaces of baseplate 90 and templates 100 are coated with a braze inhibitor paste, such as Stopoff®, which is commercially available from Pyramid Plastics, Inc., Hope Ark. 71801. The assembly is then stress relieved and bright annealed in a furnace. Panels 54 and spacers 80 are then brazed together to create model 50.

Combustor liner model 50 enables developmental testing to be performed to the combustor liner being modeled. More specifically, because combustor members 54 are contoured with templates 100, and are stepped with spacers 80, combustor liner model 50 effectively represents the combustor being modeled and produces test data that is representative of data that would be produced by the modeled combustor liner. Specifically, because combustor liner model 50 is assembled in a shorter time frame in comparison to an assembly time of the combustor being modeled, combustor liner model 50 facilitates profile and pattern factor development testing being performed at an earlier time frame in an engine development cycle. Furthermore, because combustor liner model 50 is fabricated from the same material, and with substantially the same cross-sectional profile, as the combustor liner being modeled, model 50 also facilitates aerodynamic testing, heat transfer testing, and mechanical design testing to also be performed at an earlier time frame in the development cycle.

Figure 4:
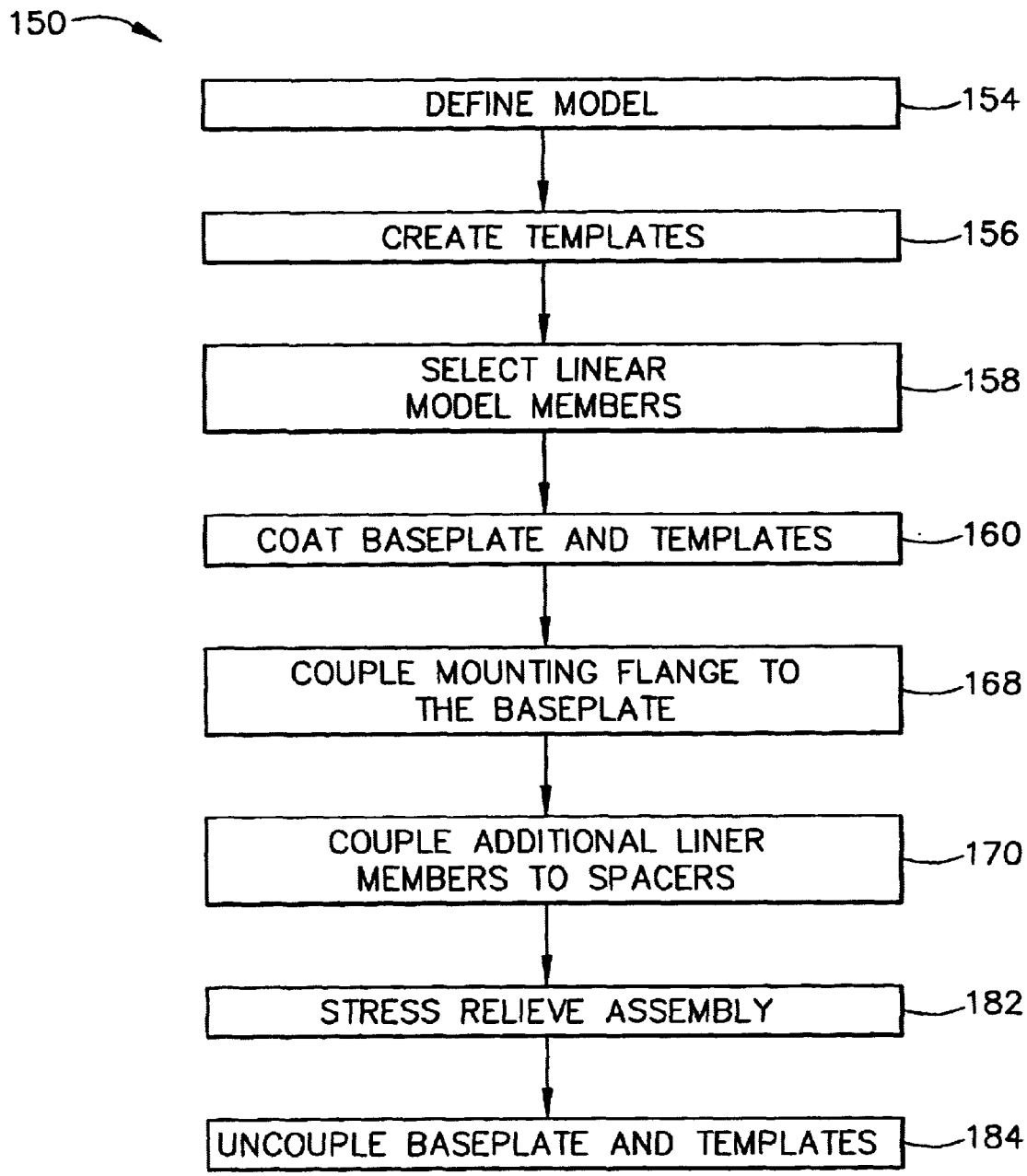
FIG. 4 is a flowchart illustrating an exemplary embodiment of a method for modeling a gas turbine engine combustor liner, such as a liner used with the combustor shown in FIG. 1.

FIG. 4 is a flowchart 150 illustrating an exemplary embodiment of a method for modeling a gas turbine engine combustor liner, such as a liner used with combustor 16 shown in FIG. 1, for performance testing. Initially, a combustor liner being modeled is defined 154 to identify which panels within the combustor liner have a more substantially cylindrical cross-sectional profile and which panels have a more substantially conical cross-sectional profile. Furthermore, as the liner being modeled is defined, a plurality of templates, such as templates 100 (shown in FIGS. 2 and 3), are created 156 that substantially duplicate the contour of the combustor liner being modeled. Additionally, flat pattern layouts are created 156 for each conical member.

A liner model member, such as members 54 (shown in FIGS. 2 and 3), is then selected 158 to represent the most downstream combustor panel of the combustor liner being modeled. In the exemplary embodiment, member 68 (shown in FIGS. 2 and 3) is the most downstream combustor panel of the combustor liner being modeled.

A baseplate, such as baseplate 90 (shown in FIG. 2) is then coated 160 with an inhibitor, and the downstream member selected 158 is coupled to the baseplate to extend substantially perpendicularly from the baseplate. In the exemplary embodiment, the liner model members are tack welded to the baseplate. Additionally, the plurality of templates created 156 are spaced circumferentially along an outer surface of the arcuate member and are then coupled 166 to the member and to the baseplate with tack welds.

A spacer, such as spacer 80 (shown in FIGS. 2 and 3), and a mounting flange, such as mounting flange 94 (shown in FIG. 3), is then coupled 168 to the member attached to the baseplate. In the exemplary embodiment, the spacers are tack welded to the member. The spacers are variably selected to create a step that has approximately the same height as nuggeted areas of the combustor liner being modeled. An additional liner model member is then selected 158 and coupled 170 to the spacer.

Additional members and spacers are coupled 170 and 168, respectively, to adjacent respective spacers and members until an assembly is created that has length measured between an upstream end and a downstream end that is approximately equal a length of the combustor being modeled. The members and spacers are then tack welded against the templates such that an inner surface of the assembly has approximately the same cross-sectional profile and contour as that of the combustor liner being modeled. In one embodiment, a sheet metal roller is used to contour the inner surface of the assembly against the templates.

The assembly is then stress relieved 182, bright annealed, and brazed, prior to the baseplate being uncoupled 184 from the members. More specifically, the method enables combustor liner models to be created that yield substantially dimensionally true components that produce substantially true test data when tested.

The above-described combustor liner model is cost-effective and highly reliable. The method facilitates producing combustor liner models that are include substantially dimensionally true components that produce substantially true test data when tested. Furthermore, the method facilitates performing developmental testing in an earlier time period of the development cycle than is possible when manufacturing known combustor liners for testing. Accordingly, the method facilitates producing combustor liner models for testing in a cost-effective and reliable manner.

While the invention has been described in terms of various specific embodiments, those skilled in the art will recognize that the invention can be practiced with modification within the spirit and scope of the claims.

What is claimed is:

1. A method for fabricating a three-dimensional turbine engine combustor liner model, said method comprising the steps of:

coupling at least a first member to a second member to form an assembly that has an inner surface that simulates an inner surface of the turbine engine combustor liner wherein the first member is at least one of a pre-formed conical member and a pre-formed cylindrical member, and wherein the second portion is at least one of a pre-formed conical member and a pre-formed cylindrical member;

coupling a plurality of templates to the assembly; and coupling the assembly to a baseplate.

2. A method in accordance with claim 1 further comprising using the templates to contour the inner surface of the assembly.

3. A method in accordance with claim 1 further comprising coupling at least one spacer between the first and second members to simulate a series of nugget steps present within the turbine engine combustor.

4. A method in accordance with claim 1 wherein coupling at least a first member to at least a second member further comprises brazing the first assembly member to the second assembly member.

5. A method in accordance with claim 1 further comprising stress relieving the assembly prior to uncoupling the assembly from the baseplate.

6. A method in accordance with claim 1 wherein coupling a plurality of templates to the assembly further comprises coupling a plurality of templates to at least one of an outer surface of the assembly and an inner surface of the assembly such that the inner surface of the assembly simulates the inner surface of the combustor liner being modeled.

7. A combustor liner model for producing test data representative of a gas turbine engine combustor, said model comprising a plurality of members coupled together, said members comprising at least a first panel member and a second panel member, said first panel member fabricated from at least one of a pre-formed metallic cylinder section and a pre-formed metallic conical section, and comprising an inner surface and an outer surface, said second panel member fabricated from at least one of a pre-formed metallic conical section and a pre-formed metallic cylindrical portion, and comprising an inner surface and an outer surface, said first panel member coupled to said second panel member such that said first panel member and second panel member inner surfaces simulate an inner surface of the modeled gas turbine engine combustor, said model further comprising a plurality of templates coupled to at least one of said first and second panel member surfaces, said templates configured to contour at least one of said first and second panel member inner surfaces.

8. A combustor liner model in accordance with claim 7 wherein said templates and said plurality of panel members fabricated from identical material.

9. A combustor liner model in accordance with claim 7 wherein each said panel member welded to at least one template.

10. A combustor liner model in accordance with claim 7 further comprising a baseplate, said plurality of panel members coupled substantially perpendicularly to said baseplate.

11. A combustor liner model in accordance with claim 10 wherein said baseplate and said plurality of panel members fabricated from identical material used in fabricating the gas turbine engine combustor liner.

12. A combustor liner model in accordance with claim 10 wherein each said panel member welded to said baseplate.

13. A combustor liner model in accordance with claim 7 further comprising at least one spacer coupled between adjacent said panel members, said spacer for simulating a nugget step present within the modeled turbine engine combustor.

14. A method for modeling a gas turbine engine combustor liner, said method comprising:

coupling a first member including at least one of a pre-formed cylindrical member and a pre-formed conical member to a spacer;

coupling a second member including at least one of a pre-formed cylindrical member and a pre-formed conical member to the spacer to form an assembly having an inner surface that simulates an inner surface of the gas turbine engine combustor liner, and wherein the spacer is between the first and second members;

coupling the assembly to a baseplate, such that the assembly extends substantially perpendicularly from the baseplate;

coupling a plurality of templates to the baseplate and to at least one of the first and second members.

15. A method in accordance with claim 14 wherein coupling a second member including at least one of a pre-formed cylindrical member and a pre-formed conical member to the spacer further comprises coupling first and second members to the spacer that are fabricated from an identical metallic material as used in fabricating the gas turbine engine combustor liner.

16. A method in accordance with claim 15 wherein coupling a plurality of templates further comprises coupling a plurality of templates to at least one of an inner surface and an outer surface of the first and second members such that the templates are configured to contour an inner surface of at least one of the first and second members.

17. A method in accordance with claim 15 wherein coupling a plurality of templates further comprises welding the templates to the baseplate and to at least one of the first and second members.

18. A method in accordance with claim 15 wherein coupling the assembly further comprises welding the assembly to the baseplate, before brazing the first and second members together.

* * * * *